US012784435B2

(12) United States Patent
Mohareri et al.

(10) Patent No.: US 12,784,435 B2
(45) Date of Patent: Nov. 3, 2026

(54) MULTI-VIEW MEDICAL ACTIVITY RECOGNITION SYSTEMS AND METHODS

(71) Applicant: Intuitive Surgical Operations, Inc., Sunnyvale, CA (US)

(72) Inventors: Omid Mohareri, San Francisco, CA (US); Adam T. Schmidt, Vancouver (CA); Aidean Sharghi Karganroodi, Pearland, TX (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 299 days.

(21) Appl. No.: 18/035,993

(22) PCT Filed: Nov. 12, 2021

(86) PCT No.: PCT/US2021/059228

§ 371 (c)(1),
(2) Date: May 9, 2023

(87) PCT Pub. No.: WO2022/104129

PCT Pub. Date: May 19, 2022

(65) Prior Publication Data

US 2023/0410491 A1 Dec. 21, 2023

Related U.S. Application Data

(60) Provisional application No. 63/141,830, filed on Jan. 26, 2021, provisional application No. 63/141,853,
(Continued)

(51) Int. Cl.
*G06V 10/98* (2022.01)
*G06V 10/12* (2022.01)
(Continued)

(52) U.S. Cl.
CPC ............ *G06V 10/993* (2022.01); *G06V 10/12* (2022.01); *G06V 10/764* (2022.01);
(Continued)

(58) Field of Classification Search
CPC .... G06V 10/993; G06V 10/12; G06V 10/764; G06V 10/774; G06V 10/809;
(Continued)

(56) References Cited

U.S. PATENT DOCUMENTS 9,437,034 B1 9/2016 Wei et al.
10,791,301 B1 9/2020 Garcia et al.
(Continued)

FOREIGN PATENT DOCUMENTS

CN 105163684 A 12/2015
CN 109661812 A 4/2019
(Continued)

OTHER PUBLICATIONS

International Search Report and Written Opinion for Application No. PCT/US2021/59228, mailed Mar. 4, 2022, 12 pages.
(Continued)

*Primary Examiner* — Kathleen M Broughton

(57) ABSTRACT

Multi-view medical activity recognition systems and methods are described herein. In certain illustrative examples, a system accesses a plurality of data streams representing imagery of a scene of a medical session captured by a plurality of sensors from a plurality of viewpoints. The system temporally aligns the plurality of data streams and determines, using a viewpoint agnostic machine learning model and based on the plurality of data streams, an activity within the scene.

15 Claims, 9 Drawing Sheets

Related U.S. Application Data filed on Jan. 26, 2021, provisional application No. 63/113,685, filed on Nov. 13, 2020.

(51) Int. Cl.

| | |
|---|---|
| ***G06V 10/764*** | (2022.01) |
| ***G06V 10/774*** | (2022.01) |
| ***G06V 10/80*** | (2022.01) |
| ***G06V 10/82*** | (2022.01) |
| ***G06V 40/20*** | (2022.01) |
| ***H04N 23/60*** | (2023.01) |
| ***H04N 23/695*** | (2023.01) |
| ***H04N 23/90*** | (2023.01) |

(52) U.S. Cl.

CPC .......... *G06V 10/774* (2022.01); *G06V 10/809* (2022.01); *G06V 10/82* (2022.01); *G06V 40/20* (2022.01); *H04N 23/64* (2023.01); *H04N 23/695* (2023.01); *H04N 23/90* (2023.01); *G06V 2201/03* (2022.01)

(58) Field of Classification Search

CPC ........ G06V 10/82; G06V 10/80; G06V 40/20; G06V 2201/03; H04N 23/64; H04N 23/695; H04N 23/90; G06F 18/24133; G06T 2207/20081; G06T 2207/20084; G06T 2207/30168; G06T 2207/30244; G06T 7/0012; G06T 7/73

See application file for complete search history.

(56) References Cited

U.S. PATENT DOCUMENTS

| | | | | |
|---|---|---|---|---|
| 11,301,684 | B1 | 4/2022 | Kumar et al. | |
| 2012/0221552 | A1 | 8/2012 | Reponen et al. | |
| 2014/0071287 | A1* | 3/2014 | Tu | G11B 27/28 348/150 |
| 2014/0333775 | A1* | 11/2014 | Naikal | H04N 21/44008 348/159 |
| 2015/0294143 | A1* | 10/2015 | Wells | G06V 40/23 348/159 |
| 2016/0063708 | A1 | 3/2016 | Okuyan et al. | |
| 2016/0324721 | A1 | 11/2016 | Freeman | |
| 2017/0329916 | A1 | 11/2017 | Bychkov et al. | |
| 2019/0090969 | A1* | 3/2019 | Jarc | A61B 34/37 |
| 2019/0223961 | A1* | 7/2019 | Barral | A61B 34/25 |
| 2019/0310819 | A1* | 10/2019 | Xu | G16H 80/00 |
| 2019/0347778 | A1 | 11/2019 | Barkley et al. | |
| 2020/0273563 | A1 | 8/2020 | Wolf et al. | |
| 2020/0279360 | A1 | 9/2020 | Barkley et al. | |
| 2021/0022812 | A1* | 1/2021 | Tako | G16H 40/63 |
| 2021/0158937 | A1* | 5/2021 | Wu | G06F 18/2413 |
| 2021/0279896 | A1 | 9/2021 | Tong et al. | |
| 2021/0286996 | A1 | 9/2021 | Saur et al. | |
| 2022/0044441 | A1 | 2/2022 | Kalra et al. | |
| 2022/0086423 | A1 | 3/2022 | Yautz et al. | |
| 2022/0113526 | A1 | 4/2022 | Mak et al. | |
| 2022/0230355 | A1 | 7/2022 | McClellan et al. | |
| 2024/0260812 | A1 | 8/2024 | Saikou | |

FOREIGN PATENT DOCUMENTS

| | | | |
|---|---|---|---|
| CN | 110679152 | A | 1/2020 |
| CN | 110770636 | A | 2/2020 |
| CN | 110851978 | A | 2/2020 |
| CN | 111179316 | A | 5/2020 |
| CN | 111466113 | A | 7/2020 |

OTHER PUBLICATIONS

Vertut, J, and Coiffet, P., “Robot Technology: Teleoperation and Robotics Evolution and Development,” English translation, Prentice-Hall, Inc., Inglewood Cliffs, NJ, USA 1986, vol. 3A, 332 pages.

Vyas S et al., “Multi-view Action Recognition Using Cross-View Video Prediction,” 16th European Conference, Glasgow, UK, Aug. 23-28, 2020, Proceedings, Part of the Lecture Notes in Computer Science, pp. 427-444.

Wang D., et al., “Dividing and Aggregating Network for Multi-view Action Recognition,” Pattern Recognition :5th Asian Conference, ACPR 2019, Auckland, New Zealand, Nov. 26-29, 2019, Revised Selected Papers, Part II, Jan. 1, 2018, Springer International Publishing, vol. 11213, pp. 457-473, URL: https://openaccess.thecvf.com/content_ECCV_2018/papers/Dongang_Wang_Dividing_and_Aggregating_ECCV_2018_paper.pdf.

International Preliminary Report on Patentability for Application No. PCT/US2021/59228 mailed May 25, 2023, 09 pages.

International Preliminary Report on Patentability for Application No. PCTUS202 1/059213 mailed May 25, 2023, 10 pages.

International Search Report and Written Opinion for Application No. PCT/US202 1/059213, mailed Mar. 2, 2022, 14 pages.

Sandoval J,et al, Autonomous Robot-Assistant Camera Holder for Minimally Invasive Surgery, Robotics and mechatronics : Proceedings of the 6th IFToMM international Symposium on Robotics and Mechatronics (ISRM 2019) Series title: Mechanisms and Machine Science, Sep. 27, 2019, Springer, vol. 78, pp. 465-472.

Extended European Search Report for Application No. EP26154167.6, mailed on Mar. 25, 2026, 7 pages.

Wang, D., et al., “Dividing and Aggregating Network for Multi-view Action Recognition.” In: Pattern Recognition : 5th Asian Conference, Jan. 1, 2018, XP055891896, vol. 11213, pp. 457-473.

* cited by examiner

MULTI-VIEW MEDICAL ACTIVITY RECOGNITION SYSTEMS AND METHODS

RELATED APPLICATIONS

The present application is a U.S. National Stage Application under 35 U.S.C. § 371 of International Application No. PCT/US2021/059228, filed on Nov. 12, 2021, which claims priority to U.S. Provisional Patent Application No. 63/141,830, filed Jan. 26, 2021, and to U.S. Provisional Patent Application No. 63/141,853, filed Jan. 26, 2021, and to U.S. Provisional Patent Application No. 63/113,685, filed Nov. 13, 2020, the contents of which are hereby incorporated by reference in their entirety.

BACKGROUND INFORMATION

Computer-implemented activity recognition typically involves capture and processing of imagery of a scene to determine characteristics of the scene. Conventional activity recognition may lack a desired level of accuracy and/or reliability for dynamic and/or complex environments. For example, some objects in a dynamic and complex environment, such as an environment associated with a surgical procedure, may become obstructed from the view of an imaging device.

SUMMARY

The following description presents a simplified summary of one or more aspects of the systems and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An exemplary system includes a memory storing instructions and a processor communicatively coupled to the memory and configured to execute the instructions to access a plurality of data streams representing imagery of a scene of a medical session captured by a plurality of sensors from a plurality of viewpoints; temporally align the plurality of data streams; and determine, using a viewpoint agnostic machine learning model and based on the plurality of data streams, an activity within the scene.

An exemplary method includes accessing, by a processor, a plurality of data streams representing imagery of a scene of a medical session captured by a plurality of sensors from a plurality of viewpoints; temporally aligning, by the processor, the plurality of data streams; and determining, by the processor, using a viewpoint agnostic machine learning model and based on the plurality of data streams, an activity within the scene.

An exemplary non-transitory computer-readable medium stores instructions executable by a processor to access a plurality of data streams representing imagery of a scene of a medical session captured by a plurality of sensors from a plurality of viewpoints; temporally align the plurality of data streams; and determine, using a viewpoint agnostic machine learning model and based on the plurality of data streams, an activity within the scene.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for multi-view medical activity recognition are described herein. An activity recognition system may include multiple sensors that include at least two imaging devices configured to capture imagery of a scene from different, arbitrary viewpoints. The activity recognition system may determine, based on the captured imagery, an activity within the scene captured in the imagery. The activity may be determined using a viewpoint agnostic machine learning model trained to fuse data based on the imagery and the activity. A viewpoint agnostic model and/or system may be configured to receive an arbitrary number of data streams from arbitrary locations and/or viewpoints and to use the arbitrary number of data streams to fuse data and determine, based on the fused data, an activity within the scene. The machine learning model may be configured to fuse the data and determine an activity within the scene in a variety of ways, as described herein.

In certain examples, the scene may be of a medical session such as a surgical session, and activities may include phases of the surgical session. As the systems and methods described herein are viewpoint agnostic, the system and methods may be implemented in any suitable environment. Any suitable number and/or configuration of sensors may be deployed and used to capture data that is provided as inputs to the systems, which may then determine activities based on the data streams provided by the sensors.

Systems and methods described herein may provide various advantages and benefits. For example, systems and methods described herein may provide accurate, dynamic, and/or flexible activity recognition using various sensor configurations in various environments. Illustrative examples of activity recognition described herein may be more accurate and/or flexible than conventional activity recognition that is based on single-sensor activity recognition or fixed multi-sensor activity recognition. Illustrative examples of systems and methods described herein may be well suited for activity recognition of dynamic and/or complex scenes, such as a scene associated with a medical session.

Various illustrative embodiments will now be described in more detail. The disclosed systems and methods may provide one or more of the benefits mentioned above and/or various additional and/or alternative benefits that will be made apparent herein.

Figure 1:
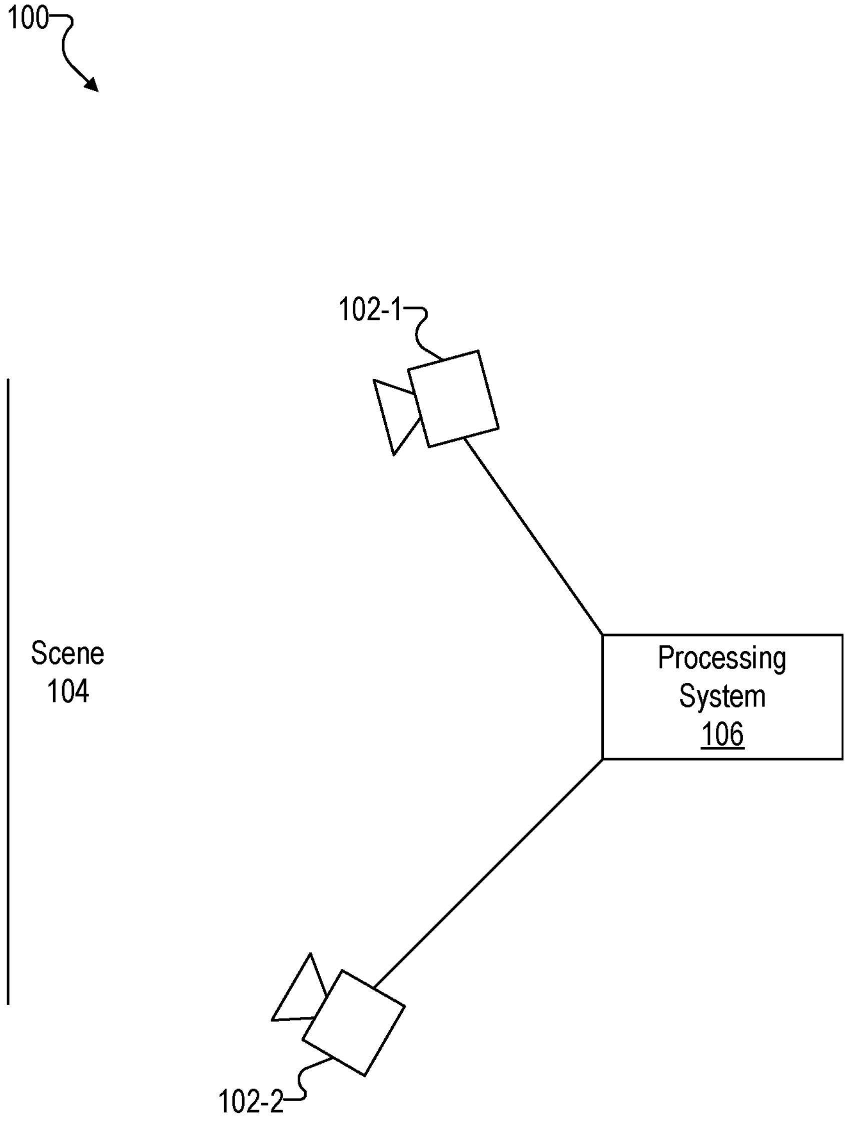
FIG. 1 depicts an illustrative multi-view medical activity recognition system according to principles described herein.

FIG. 1 depicts an illustrative multi-view medical activity recognition system 100 ("system 100"). As shown, system 100 may include multiple sensors, such as imaging devices 102-1 and 102-2 (collectively "imaging devices 102"), positioned relative to a scene 104. Imaging devices 102 may be configured to image scene 104 by concurrently capturing images of scene 104.

Scene 104 may include any environment and/or elements of an environment that may be imaged by imaging devices 102. For example, scene 104 may include a tangible real-world scene of physical elements. In certain illustrative examples, scene 104 is associated with a medical session such as a surgical session. For example, scene 104 may include a surgical scene at a surgical site such as a surgical facility, operating room, or the like. For instance, scene 104 may include all or part of an operating room in which a surgical procedure may be performed on a patient. In certain implementations, scene 104 includes an area of an operating room proximate to a robotic surgical system that is used to perform a surgical procedure. In certain implementations, scene 104 includes an area within a body of a patient. While certain illustrative examples described herein are directed to scene 104 including a scene at a surgical facility, one or more principles described herein may be applied to other suitable scenes in other implementations.

Imaging devices 102 may include any imaging devices configured to capture images of scene 104. For example, imaging devices 102 may include video imaging devices, infrared imaging devices, visible light imaging devices, non-visible light imaging devices, intensity imaging devices (e.g., color, grayscale, black and white imaging devices), depth imaging devices (e.g., stereoscopic imaging devices, time-of-flight imaging devices, infrared imaging devices, etc.), endoscopic imaging devices, any other imaging devices, or any combination or sub-combination of such imaging devices. Imaging devices 102 may be configured to capture images of scene 104 at any suitable capture rates. Imaging devices 102 may be synchronized in any suitable way for synchronous capture of images of scene 104. The synchronization may include operations of the imaging devices being synchronized and/or data sets output by the imaging devices being synchronized by matching data sets to common points in time.

FIG. 1 illustrates a simple configuration of two imaging devices 102 positioned to capture images of scene 104 from two different viewpoints. This configuration is illustrative. It will be understood that a multi-sensor architecture such as a multi-view architecture may include two or more imaging devices 102 positioned to capture images of scene 104 from two or more different viewpoints. For example, system 100 may include an arbitrary number of imaging devices 102 up to a predefined maximum that system 100 is configured to receive. The predefined maximum may be based on a number of input ports for imaging devices 102, a maximum processing capacity of system 100, a maximum bandwidth for communication of system 100, or any other such characteristics. Imaging devices 102 may be positioned at arbitrary locations that each allow a respective imaging device 102 to capture images of scene 104 from a particular viewpoint or viewpoints. Any suitable location for a sensor may be considered an arbitrary location, which may include fixed locations that are not determined by system 100, random locations, and/or dynamic locations. The viewpoint of an imaging device 102 (i.e., the position, orientation, and view settings such as zoom for imaging device 102) determines the content of the images that are captured by imaging device 102. The multi-sensor architecture may further include additional sensors positioned to capture data of scene 104 from additional locations. Such additional sensors may include any suitable sensors configured to capture data, such as microphones, kinematics sensors (e.g., accelerometers, gyroscopes, sensors associated with the robotic surgical system, etc.), force sensors (e.g., sensors associated with surgical instruments, etc.), temperature sensors, motion sensors, non-imaging devices, additional imaging devices, other types of imaging devices, etc.

System 100 may include a processing system 106 communicatively coupled to imaging devices 102. Processing system 106 may be configured to access imagery captured by imaging devices 102 and determine an activity of scene 104 as further described herein.

Figure 2:
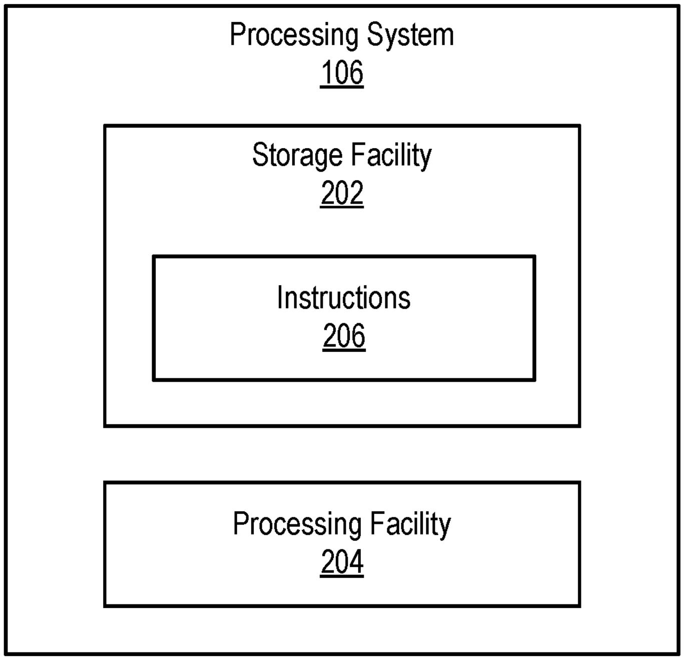
FIG. 2 depicts an illustrative processing system according to principles described herein.

FIG. 2 illustrates an example configuration of processing system 106 of a multi-view medical activity recognition system (e.g., system 100). Processing system 106 may include, without limitation, a storage facility 202 and a processing facility 204 selectively and communicatively coupled to one another. Facilities 202 and 204 may each include or be implemented by one or more physical computing devices including hardware and/or software components such as processors, memories, storage drives, communication interfaces, instructions stored in memory for execution by the processors, and so forth. Although facilities 202 and 204 are shown to be separate facilities in FIG. 2, facilities 202 and 204 may be combined into fewer facilities, such as into a single facility, or divided into more facilities as may serve a particular implementation. In some examples, each of facilities 202 and 204 may be distributed between multiple devices and/or multiple locations as may serve a particular implementation.

Storage facility 202 may maintain (e.g., store) executable data used by processing facility 204 to perform any of the functionality described herein. For example, storage facility 202 may store instructions 206 that may be executed by processing facility 204 to perform one or more of the operations described herein. Instructions 206 may be implemented by any suitable application, software, code, and/or other executable data instance. Storage facility 202 may also maintain any data received, generated, managed, used, and/or transmitted by processing facility 204.

Processing facility 204 may be configured to perform (e.g., execute instructions 206 stored in storage facility 202 to perform) various operations associated with activity recognition, such as activity recognition of a scene of a medical session performed and/or facilitated by a computer-assisted surgical system.

These and other illustrative operations that may be performed by processing system 106 (e.g., by processing facility 204 of processing system 106) are described herein. In the description that follows, any references to functions performed by processing system 106 may be understood to be performed by processing facility 204 based on instructions 206 stored in storage facility 202.

Figure 3:
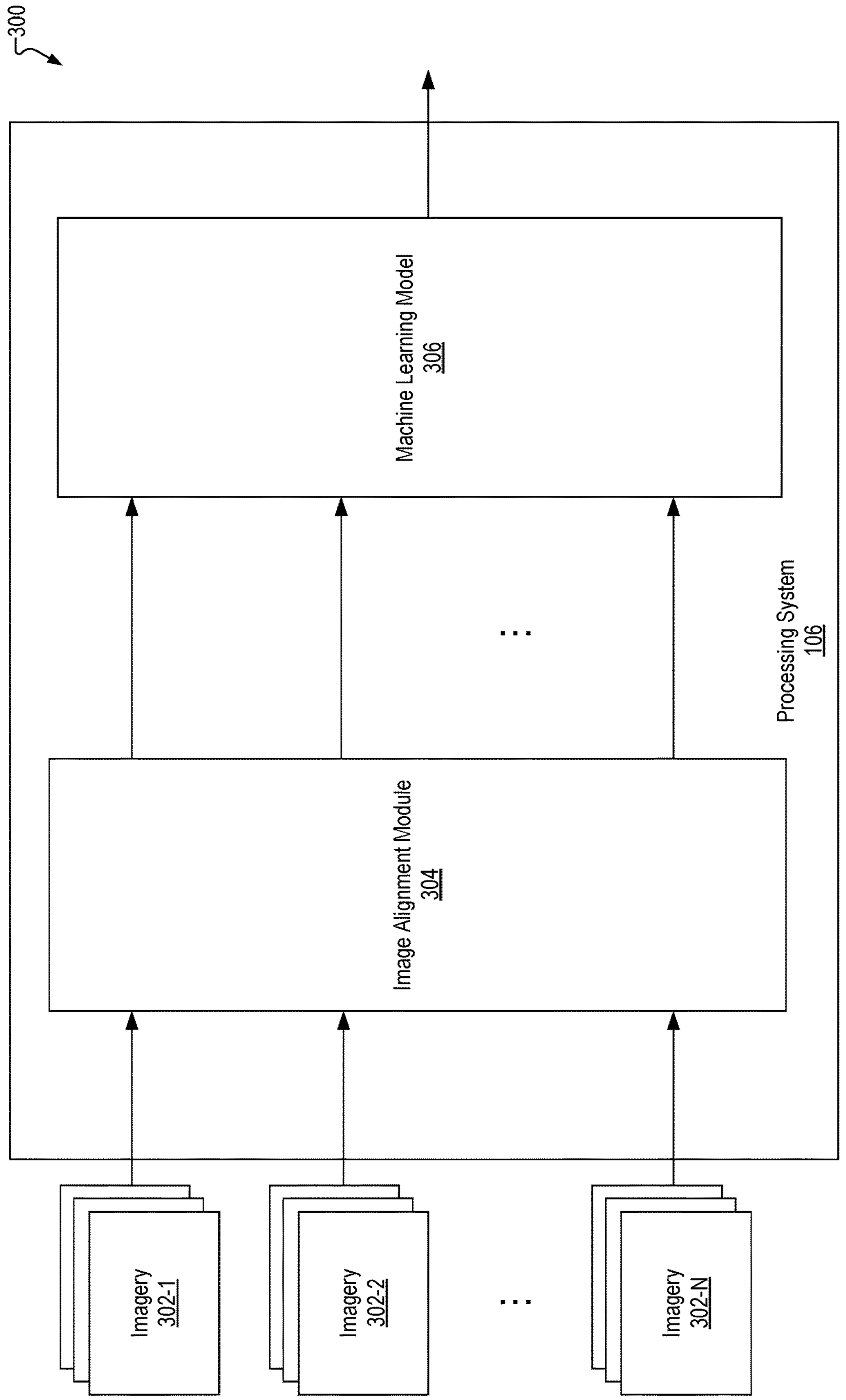
FIGS. 3-5 depict illustrative multi-view medical activity recognition systems according to principles described herein.

FIG. 3 illustrates an example configuration 300 of processing system 106. As shown, processing system 106 accesses imagery 302 (e.g., imagery 302-1 through 302-N) of a scene (e.g., scene 104) captured by imaging devices (e.g., imaging devices 102) of an activity recognition system (e.g., system 100). Processing system 106 includes an image alignment module 304 configured to temporally align imagery 302. Processing system 106 also includes a machine learning model 306 configured to determine, based on the temporally aligned imagery 302, an activity within the scene.

For example, processing system 106 may receive imagery 302-1 from imaging device 102-1. Imagery 302-1 may include and/or be represented by any image data that represents a plurality of images, or one or more aspects of images, captured by imaging device 102-1 of scene 104. For instance, the plurality of images may be an image stream in the form of one or more video clips. Each video clip may include a time-sequenced series of images captured over a period of time. Each video clip may include any suitable number (e.g., 16, 32, etc.) of frames (e.g., images). The video clips may capture one or more activities being performed in scene 104. Activities may be any action performed in scene 104 by a person or a system. In some examples, scene 104 may depict a medical session, and activities may be specific to actions performed associated with the medical session of scene 104, such as predefined phases of the medical session. For instance, a particular surgical session may include 10-20 (or any other suitable number of) different predefined phases, such as sterile preparation, patient roll in, surgery, etc., that may be a defined set of activities from which system 100 classifies activities of scene 104 as captured in particular video clips.

Processing system 106 may access imagery 302-1 (e.g., one or more video clips) in any suitable manner. For instance, processing system 106 may receive imagery 302-1 from imaging device 102-1, retrieve imagery 302-1 from imaging device 102-1, receive and/or retrieve imagery 302-1 from a storage device and/or any other suitable device that is communicatively coupled to imaging device 102-1, etc.

Image alignment module 304 may access imagery 302-1 along with imagery 302-2 through 302-N and align imagery 302 temporally. For instance, imagery 302-1 may include images of scene 104 captured from a first viewpoint associated with imaging device 102-1. Imagery 302-2 may include images of scene 104 captured from a second viewpoint associated with imaging device 102-2, and so forth for each instance of imagery 302 (which may be captured by additional imaging devices not shown in FIG. 1). Image alignment module 304 may align imagery 302 temporally so that aligned images of imagery 302 (e.g., temporally aligned video frames) depict a same or substantially same point in time of scene 104, captured from different viewpoints.

Image alignment module 304 may temporally align imagery 302 in any suitable manner. For instance, some or all of the images of imagery 302 may include a timestamp or other time information associated with the images, and image alignment module 304 may use the information to align imagery 302. For example, one or more image streams of imagery 302 (e.g., imagery 302-1), may be used as a primary image stream, while other image streams (e.g., imagery 302-2 through imagery 302-N) may be aligned to the primary image stream using nearest prior-timestamped images for each of the other image streams. In this manner, image alignment module 304 may temporally align imagery 302 in real time, even if the image streams of imagery 302 include different numbers of images, frame rates, dropped images, etc.

Machine learning model 306 may determine, based on the temporally aligned imagery 302, an activity of scene 104 captured by imagery 302. Machine learning model 306 may determine the activity in any suitable manner, as described further herein. For example, machine learning model 306 may be a viewpoint agnostic machine learning model trained to determine the activity of scene 104 based on imagery 302 that includes an arbitrary number of image streams captured from arbitrary viewpoints. As a result, the configuration of imaging devices 102 is not constrained by the model to a fixed number of imaging devices 102 or to imaging devices 102 being located only at certain fixed or relative locations, but processing system 106 may be configured to receive inputs from any configuration of imaging devices 102 in any suitable medical setting and/or environment. For instance, system 100 may be a dynamic system or include dynamic components, such as one or more imaging devices 102 having viewpoints that may be dynamically changed during a medical session (e.g., during any phase of the medical session such as during pre-operative activities (e.g., setup activities), intra-operative activities, and/or post-operative activities). The viewpoint of an imaging device 102 may dynamically change in any way that changes the field of view of the imaging device 102, such as by changing a location, pose, orientation, zoom setting, or other parameter of the imaging device 102. Further, while configuration 300 shows imagery 302 including image streams, machine learning model 306 (and processing system 106) may be configured to access any suitable data streams (e.g., audio data, kinematic data, etc.) captured from scene 104 by any suitable sensors as described herein. Machine learning model 306 may be trained to determine the activity of scene 104 further based on such data streams.

Figure 4:
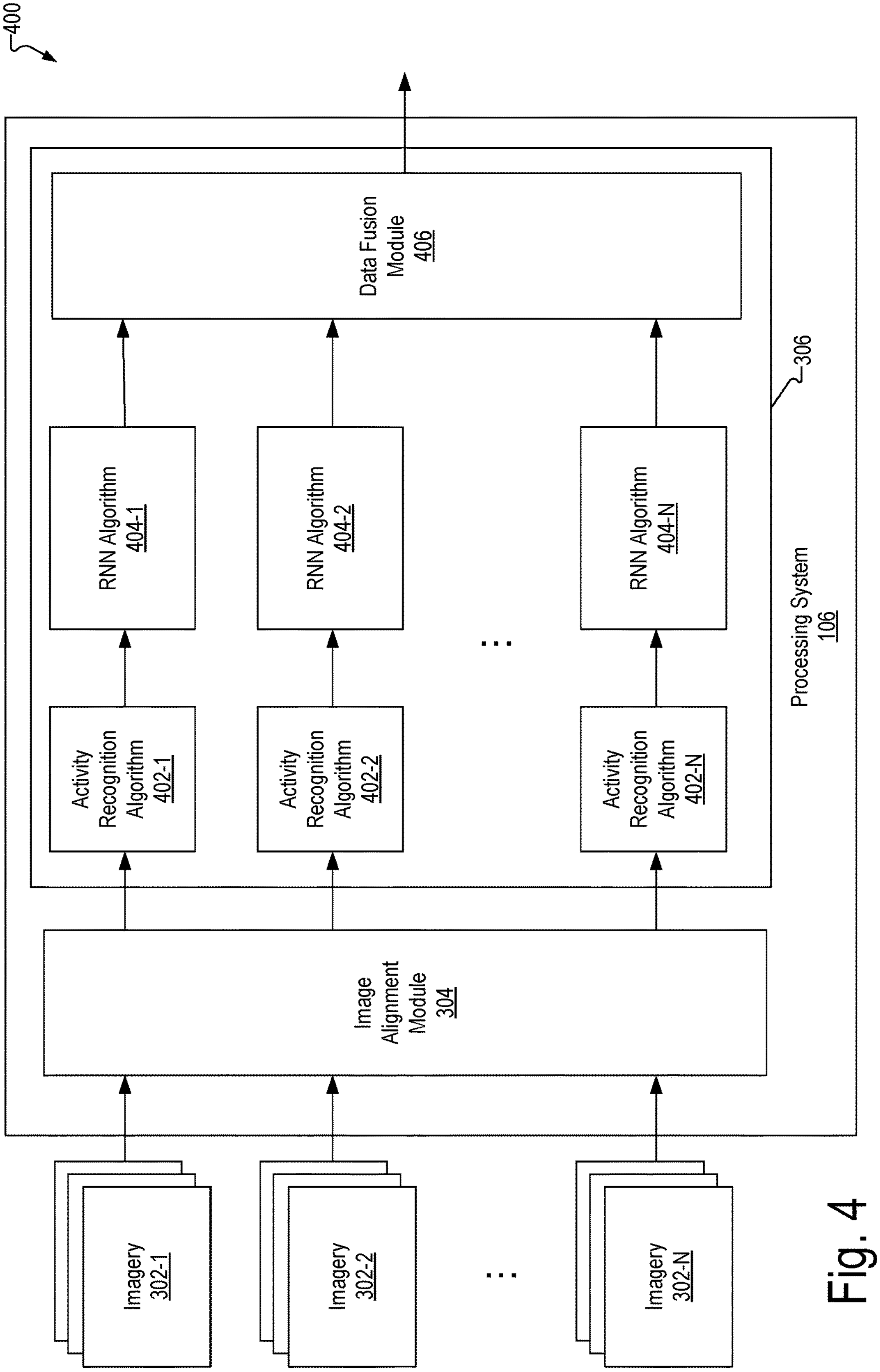

FIG. 4 illustrates an example configuration 400 of processing system 106 showing an example implementation of machine learning model 306. As in configuration 300, configuration 400 shows processing system 106 accessing imagery 302 and image alignment module 304 temporally aligning imagery 302. Further, processing system 106 is configured to determine an activity of scene 104 captured by imagery 302 using machine learning model 306. As shown, machine learning model 306 includes activity recognition algorithms 402 (e.g., activity recognition algorithm 402-1 through 402-N), recurrent neural network (RNN) algorithms 404 (e.g., RNN algorithm 404-1 through 404-N), and a data fusion module 406.

As described, each instance of imagery 302 may be an image stream that includes video clips. Machine learning model 306 uses activity recognition algorithms 402 to extract features of video clips of respective image streams to determine an activity within the scene captured in the video clips. For instance, activity recognition algorithm 402-1 may extract features of video clips of imagery 302-1, activity recognition algorithm 402-2 may extract features of video clips of imagery 302-2, etc. Activity recognition algorithms 402 may be implemented by any suitable algorithm or algorithms, such as a fine-tuned 13D model or any other neural network or other algorithm. Each of activity recognition algorithms 402 may be an instance of a same set of algorithms and/or implemented using different sets of algorithms.

Activity recognition algorithms 402 each provide an output to a respective RNN algorithm 404. RNN algorithms 404 may use the features extracted by activity recognition algorithms 402 to determine respective classifications of an activity of scene 104. For example, RNN algorithm 404-1 may receive features extracted from imagery 302-1 by activity recognition algorithm 402-1 and determine a first classification of the activity of scene 104 as captured from a first viewpoint associated with imaging device 102-1. Similarly, RNN algorithm 404-2 may determine a second classification of the activity of scene 104 as captured from a second viewpoint associated with imaging device 102-2, based on features extracted by activity recognition algorithm 402-2 from imagery 302-2, and so forth through RNN algorithm 404-N.

RNN algorithms 404 may each provide a classification to data fusion module 406, which may generate fused data for determining the activity of scene 104. For example, data fusion module 406 may receive a respective classification of the activity of scene 104 from each of RNN algorithms 404 and determine, based on the respective classifications, a final classification of the activity of scene 104. Data fusion module 406 may generate the fused data to determine the final classification in any suitable manner. For instance, data fusion module 406 may weight the classifications from RNN algorithms 404 to determine the final classification.

Additionally, in some examples, data fusion module 406 may receive additional information with each classification to generate the fused data to determine the activity of scene 104. For instance, data fusion module 406 may also receive an activity visibility metric for each video clip or image stream that rates how visible the activity of scene 104 is in corresponding imagery. The activity visibility metric may include a score or any other metric that represents a rating of how visible an activity of scene 104 is in the imagery. For example, the activity visibility metric may be based on a general visibility of imagery 302 and/or specific visibility of the activity in imagery 302. General visibility may correspond to how generally visible any content of imagery 302 is in imagery 302, while specific visibility of the activity may be based on how visible the activity of scene 104 is in imagery 302, which may be separate from the general visibility. Based on such activity visibility metrics, data fusion module 406 may weight the classification determined from the imagery higher for a relatively high activity visibility metric and/or lower for a relatively low activity visibility metric.

Additionally or alternatively, data fusion module 406 may receive a confidence measure for the classifications as generated by RNN algorithms 404. Data fusion module 406 may further weight the classifications based on the confidence measures. Additionally or alternatively, data fusion module 406 may base the generating of fused data and/or the determining of the activity of scene 104 on any other such suitable information associated with the classifications and/or imagery.

Further, machine learning model 306 as shown includes multiple layers (e.g., stages) of algorithms. Such layers may refer to algorithms or processes (e.g., activity recognition algorithm 402, RNN algorithm 404), represented as "vertical" layers in configuration 400, and/or channels of data processing (e.g., imagery 302-1 processed through activity recognition algorithm 402-1, RNN algorithm 404-1, etc.), represented as "horizontal" layers in configuration 400. Other embodiments of machine learning model 306 may include additional, fewer, or different layers (e.g., different configurations of layers). Further, layers (horizontal and/or vertical) of machine learning model 306 may be connected in any suitable manner such that connected layers may communicate and/or share data between or among layers.

As one example implementation of configuration 400, each video clip of imagery 302 may be denoted as $$C_t^{ij}$$

as a synchronized clip of size $l_{clip}$ ending at time t. i denotes a viewpoint of a primary image stream while j denotes a viewpoint of a secondary image stream that is aligned to the primary image stream.

Activity recognition algorithm 402 may be implemented using an 13D algorithm, which may be trained to include a set of weights for an 13D model f, configured to receive a video clip and output a classification. Thus, video clips are transformed with the 13D model to generate a set of latent vectors z:

$$z_s^{ij} = \left(f\left(C_{16}^{ij}\right), \ldots, f\left(C_{s*16}^{ij}\right)\right).$$

These latent vectors may be input into an implementation of RNN algorithm 404 denoted as g, which uses the latent vectors, a few fully connected layers, and an RNN to estimate an output classification:

$$\hat{y}_s^i = fc\left(g\left(\left(z_s^{ij}\right)_{j=1}^{N}\right)\right),$$

where $$\hat{y}_s^i$$

is an estimated logit probability for clip s from viewpoint i, g is the RNN model, and $fc:\mathbb{R}^{d_{latent}} \rightarrow \mathbb{R}^{d_{classes}}$ is a fully-connected final layer that outputs logits of size classes. The model g generates respective classifications of each image stream (using single-view versions of model, $g_{single}$) and fuses the classifications adaptively.

For instance, each $g_{single}$ may be configured to output a $d_{latent}$ dimensional output:

$$v_{single}^i = g_{single}\left(z^{ii}\right),$$

where g receives all prior frames of a single viewpoint/as inputs and outputs a feature $$v_{single}^i \in \mathbb{R}^{d_{latent}}$$

that is turned into a logit probability with a fully connected layer. The fully connected layer may be used to obtain an estimated classification vector.

$$\hat{y}_{single}^i = fc\left(v_{single}^i\right).$$

Data fusion module 406 may be implemented to generate $$g_{multi} = \text{mix}\left(g_{single}\left(z^{i0}\right), \ldots, \left(g_{single}\left(z^{iN}\right)\right)\right),$$

where mix takes in a set of $d_{latent}$ sized vectors and fuses the vectors by summing over the set of vectors:

$$\sum_j w_j g_{single}\left(z^{ij}\right).$$

A fully connected layer may output the final classification:

$$\hat{y} = fc(g_{multi}).$$

The mixing weights w may be predefined, such as $w_j=1/N$, resulting in an average pooling of each image stream. Additionally or alternatively, any other such predefined functions may be used, such as a maximum function (e.g., choosing a most confident classification), etc.

Alternatively, weights w may be based on inputs as described herein. For instance, an attention algorithm may be used to determine the weightings, such as a weight vector defined by $$w^T = softmax\left(\frac{q^T K}{\sqrt{d_k}}\right),$$
$$K \in \mathbb{R}^{d_k \times N},$$

where q is a query vector globally estimated using average pooling of latent vectors, K is a matrix of latent view feature vectors, and $d_k$ is a dimension of a mixer module of data fusion module 406. Thus, this example machine learning model 306 may be denoted as $$\hat{y} = fc\left(\text{mix}\left(\left(g_{single}(z^{ij})\right)_{j=1}^{N}\right)\right).$$

Figure 5:
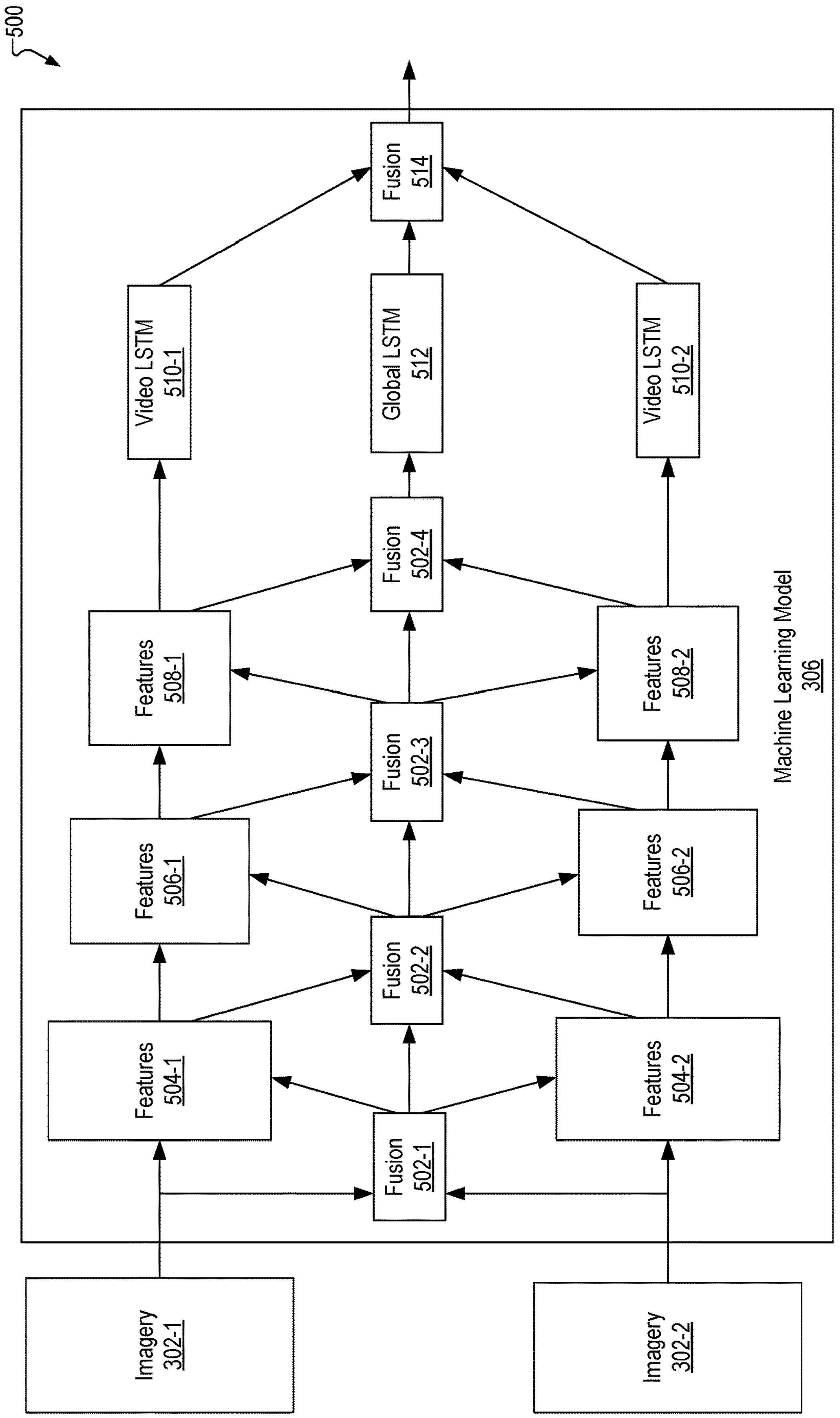

FIG. 5 illustrates an example configuration 500 showing another example implementation of machine learning model 306. Configuration 500 may be similar to configuration 300, including processing system 106 and image alignment module 304, though not shown in FIG. 5. While configuration 400 shows machine learning model 306 configured to generate fused data based on classifications determined from each instance of imagery 302 (e.g., each data stream), configuration 500 shows machine learning model 306 configured to generate fused data based more directly on imagery 302 and features extracted from imagery 302.

For example, as shown, machine learning model 306 includes data fusion modules 502 (e.g., data fusion module 502-1 through 502-4). Machine learning model 306 further includes feature processing modules 504 (e.g., feature processing module 504-1 and 504-2), feature processing modules 506 (e.g., feature processing module 506-1 and 506-2), and feature processing modules 508 (e.g., feature processing module 508-1 and 508-2). Each of data fusion modules 502 may be configured to receive data (e.g., imagery, features extracted from imagery, and/or other features), combine the data, and provide the data to one or more next modules.

For instance, data fusion module 502-1 may access imagery 302 (e.g., imagery 302-1 and imagery 302-2). Data fusion module 502-1 may generate fused data based on imagery 302 and provide the fused data to feature processing modules 504 and data fusion module 502-2. Feature processing modules 504 may be configured to extract features from imagery 302 based on the fused data received from data fusion module 502-1. Data fusion module 502-2 may receive the fused data from data fusion module 502-1 as well as the features extracted by feature processing modules 504 and generate fused data based on some or all of these inputs. In turn, data fusion module 502-2 may output the fused data to feature processing modules 506 as well as data fusion module 502-3. Feature processing modules 506 may be configured to extract features from the features extracted by feature processing modules 504 (e.g., dimensionality reduction, etc.), based on the fused data generated by data fusion module 502-2. Additionally or alternatively, feature processing modules 506 (as well as feature processing modules 504 and 508) may be configured to otherwise process features (e.g., concatenation, addition, pooling, regression, etc.) based on fused data.

Each of data fusion modules 502 may be configured to fuse data in any suitable manner. For example, data fusion modules 502 may include machine learning algorithms trained to weight inputs based on imagery 302 and the activity of scene 104 captured by imagery 302. Data fusion modules 502 may be trained end to end to learn these weights based on training data as described herein.

Machine learning model 306 further includes video long short-term memories (LSTMs) 510 (e.g., video LSTM 510-1 and 510-2) configured to determine a classification of an activity of scene 104 as captured by imagery 302. For example, video LSTM 510-1 may determine a first classification of the activity based on imagery 302-1 and features extracted and/or processed by feature processing modules 504-1, 506-1, and 508-1. Video LSTM 510-2 may determine a second classification of the activity based on imagery 302-2 and features extracted and/or processed by feature processing modules 504-2, 506-2, and 508-2. As shown, while the classification of video LSTMs 510 may be based on respective image streams of imagery 302 (e.g., video LSTM 510-1 based on imagery 302-1 and video LSTM 510-2 based on imagery 302-2), as feature processing modules 504-508 shared fused data generated by data fusion modules 502, each respective classification may result in a more accurate determination of the activity of scene 104 than a classification based solely on individual image streams.

Machine learning model 306 further includes a global LSTM 512 configured to determine a global classification of the activity of scene 104 based on fused data generated by data fusion module 502-4. As the global classification is based on fused data, the global classification may be a determination of the activity of scene 104 based on both imagery 302-1 and imagery 302-2.

Machine learning model 306 further includes a data fusion module 514 that is configured to receive the classifications of video LSTMs 510 and the global classification of global LSTM 512. Based on these classifications, data fusion module 514 may determine a final classification to determine the activity of scene 104. Data fusion module 514 may determine the final classification in any suitable manner as described herein.

While configuration 500 shows two image streams of imagery 302, machine learning model 306 may be configured to receive and use any arbitrary number of image streams from arbitrary viewpoints and/or other data streams to determine the activity of scene 104. Further, while configuration 500 shows three stages of feature processing and four stages of data fusion modules 502 between feature processing modules 504-508, machine learning model 306 may include any suitable number of feature processing modules and data fusion modules. For instance, in some examples, fused data may be generated on a subset of features and/or data (e.g., only on imagery 302, only after feature processing modules 508, or any other suitable combination).

Further, while configuration 500 includes video LSTMs 510, in some examples, machine learning model 306 may omit video LSTMs 510 (and data fusion module 514) and base the final classification on the global classification as determined by global LSTM 512.

In order to determine a weighting to apply to inputs to generate fused data, machine learning model 306 may be trained based on training data. Once trained, machine learning model 306 is configured to determine a weighting to apply to inputs. For example, for configuration 400, inputs may include classifications based on one or more of the classifications, the imagery, and/or the activity within the scene. For configuration 500, inputs may include imagery 302, features of imagery 302, and/or the activity within the scene.

Machine learning model 306 may be trained end to end based on labeled sets of imagery. Additionally or alternatively, specific modules and/or sets of modules (e.g., RNN algorithms 404 and/or data fusion module 406, any of data fusion modules 502, video LSTMs 510, and/or global LSTM 512) may be trained on labeled sets of imagery to predict activity classifications based on imagery 302.

Training data sets may include imagery of medical sessions, such as imagery similar to imagery 302, captured by imaging devices. Training data sets may further include subsets of the imagery captured by the imaging devices of the medical session. For example, a particular medical session may be captured by four imaging devices and the video clips of the four image streams labeled to generate a training set. A subset including the video clips of three of the four image streams may be used as another training data set. Thus, using a same set of image streams, multiple training data sets may be generated. Additionally or alternatively, training data sets may be generated based on image streams. For instance, video clips from two or more image streams may be interpolated and/or otherwise processed to generate additional video clips that may be included in additional training data sets. In this manner, machine learning model 306 may be trained to be viewpoint agnostic, able to determine activities of scenes based on arbitrary numbers of image streams from arbitrary viewpoints. In some implementations, viewpoint agnostic may mean an arbitrary number of imaging devices capturing imagery from predetermined viewpoints. In some implementations, viewpoint agnostic may mean a predetermined number of imaging devices capturing imagery from arbitrary positions, orientations, and/or settings of the imaging devices 102. In some implementations, viewpoint agnostic may mean an arbitrary number of imaging devices capturing imagery from arbitrary viewpoints of the imaging devices. Thus, a viewpoint agnostic model may be agnostic to the number of image capture devices 102 and/or the viewpoints of those image capture devices 102.

Figure 6:
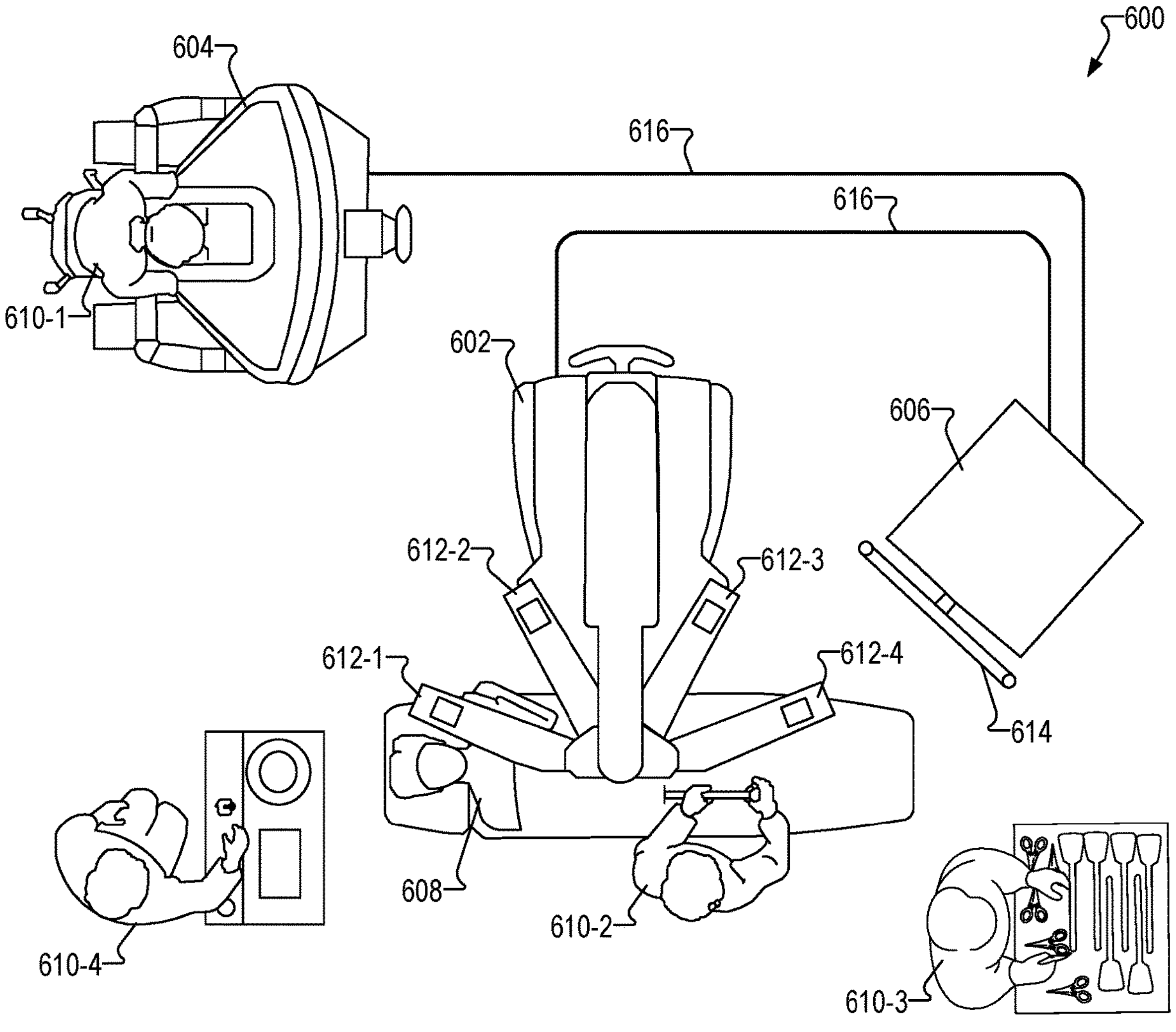
FIG. 6 depicts an illustrative computer-assisted robotic surgical system according to principles described herein.

System 100 may be associated with a computer-assisted robotic surgical system, such as shown in FIG. 6. FIG. 6 illustrates an exemplary computer-assisted robotic surgical system 600 ("surgical system 600"). System 100 may be implemented by surgical system 600, connected to surgical system 600, and/or otherwise used in conjunction with surgical system 600. For example, system 100 may be implemented by one or more components of surgical system 600 such as a manipulating system, a user control system, or an auxiliary system. As another example, system 100 may be implemented by a stand-alone computing system communicatively coupled to a computer-assisted surgical system.

As shown, surgical system 600 may include a manipulating system 602, a user control system 604, and an auxiliary system 606 communicatively coupled one to another. Surgical system 600 may be utilized by a surgical team to perform a computer-assisted surgical procedure on a patient 608. As shown, the surgical team may include a surgeon 610-1, an assistant 610-2, a nurse 610-3, and an anesthesiologist 610-4, all of whom may be collectively referred to as "surgical team members 610." Additional or alternative surgical team members may be present during a surgical session.

While FIG. 6 illustrates an ongoing minimally invasive surgical procedure, it will be understood that surgical system 600 may similarly be used to perform open surgical procedures or other types of surgical procedures that may similarly benefit from the accuracy and convenience of surgical system 600. Additionally, it will be understood that a medical session such as a surgical session throughout which surgical system 600 may be employed may not only include an operative phase of a surgical procedure, as is illustrated in FIG. 6, but may also include preoperative (which may include setup of surgical system 600), postoperative, and/or other suitable phases of the surgical session.

As shown in FIG. 6, manipulating system 602 may include a plurality of manipulator arms 612 (e.g., manipulator arms 612-1 through 612-4) to which a plurality of surgical instruments may be coupled. Each surgical instrument may be implemented by any suitable surgical tool (e.g., a tool having tissue-interaction functions), medical tool, imaging device (e.g., an endoscope, an ultrasound tool, etc.), sensing instrument (e.g., a force-sensing surgical instrument), diagnostic instrument, or the like that may be used for a computer-assisted surgical procedure on patient 608 (e.g., by being at least partially inserted into patient 608 and manipulated to perform a computer-assisted surgical procedure on patient 608). While manipulating system 602 is depicted and described herein as including four manipulator arms 612, it will be recognized that manipulating system 602 may include only a single manipulator arm 612 or any other number of manipulator arms as may serve a particular implementation.

Manipulator arms 612 and/or surgical instruments attached to manipulator arms 612 may include one or more displacement transducers, orientational sensors, and/or positional sensors used to generate raw (i.e., uncorrected) kinematics information. One or more components of surgical system 600 may be configured to use the kinematics information to track (e.g., determine poses of) and/or control the surgical instruments, as well as anything connected to the instruments and/or arms. As described herein, system 100 may use the kinematics information to track components of surgical system 600 (e.g., manipulator arms 612 and/or surgical instruments attached to manipulator arms 612).

User control system 604 may be configured to facilitate control by surgeon 610-1 of manipulator arms 612 and surgical instruments attached to manipulator arms 612. For example, surgeon 610-1 may interact with user control system 604 to remotely move or manipulate manipulator arms 612 and the surgical instruments. To this end, user control system 604 may provide surgeon 610-1 with imagery (e.g., high-definition 3D imagery) of a surgical site associated with patient 608 as captured by an imaging system (e.g., an endoscope). In certain examples, user control system 604 may include a stereo viewer having two displays where stereoscopic images of a surgical site associated with patient 608 and generated by a stereoscopic imaging system may be viewed by surgeon 610-1. Surgeon 610-1 may utilize the imagery displayed by user control system 604 to perform one or more procedures with one or more surgical instruments attached to manipulator arms 612.

To facilitate control of surgical instruments, user control system 604 may include a set of master controls. These master controls may be manipulated by surgeon 610-1 to control movement of surgical instruments (e.g., by utilizing robotic and/or teleoperation technology). The master controls may be configured to detect a wide variety of hand, wrist, and finger movements by surgeon 610-1. In this manner, surgeon 610-1 may intuitively perform a procedure using one or more surgical instruments.

Auxiliary system 606 may include one or more computing devices configured to perform processing operations of surgical system 600. In such configurations, the one or more computing devices included in auxiliary system 606 may control and/or coordinate operations performed by various other components (e.g., manipulating system 602 and user control system 604) of surgical system 600. For example, a computing device included in user control system 604 may transmit instructions to manipulating system 602 by way of the one or more computing devices included in auxiliary system 606. As another example, auxiliary system 606 may receive and process image data representative of imagery captured by one or more imaging devices attached to manipulating system 602.

In some examples, auxiliary system 606 may be configured to present visual content to surgical team members 610 who may not have access to the images provided to surgeon 610-1 at user control system 604. To this end, auxiliary system 606 may include a display monitor 614 configured to display one or more user interfaces, such as images of the surgical site, information associated with patient 608 and/or the surgical procedure, and/or any other visual content as may serve a particular implementation. For example, display monitor 614 may display images of the surgical site together with additional content (e.g., graphical content, contextual information, etc.) concurrently displayed with the images. In some embodiments, display monitor 614 is implemented by a touchscreen display with which surgical team members 610 may interact (e.g., by way of touch gestures) to provide user input to surgical system 600.

Manipulating system 602, user control system 604, and auxiliary system 606 may be communicatively coupled one to another in any suitable manner. For example, as shown in FIG. 6, manipulating system 602, user control system 604, and auxiliary system 606 may be communicatively coupled by way of control lines 616, which may represent any wired or wireless communication link as may serve a particular implementation. To this end, manipulating system 602, user control system 604, and auxiliary system 606 may each include one or more wired or wireless communication interfaces, such as one or more local area network interfaces, Wi-Fi network interfaces, cellular interfaces, etc.

In certain examples, imaging devices such as imaging devices 102 may be attached to components of surgical system 600 and/or components of a surgical facility where surgical system 600 is set up. For example, imaging devices may be attached to components of manipulating system 602.

Figure 7:
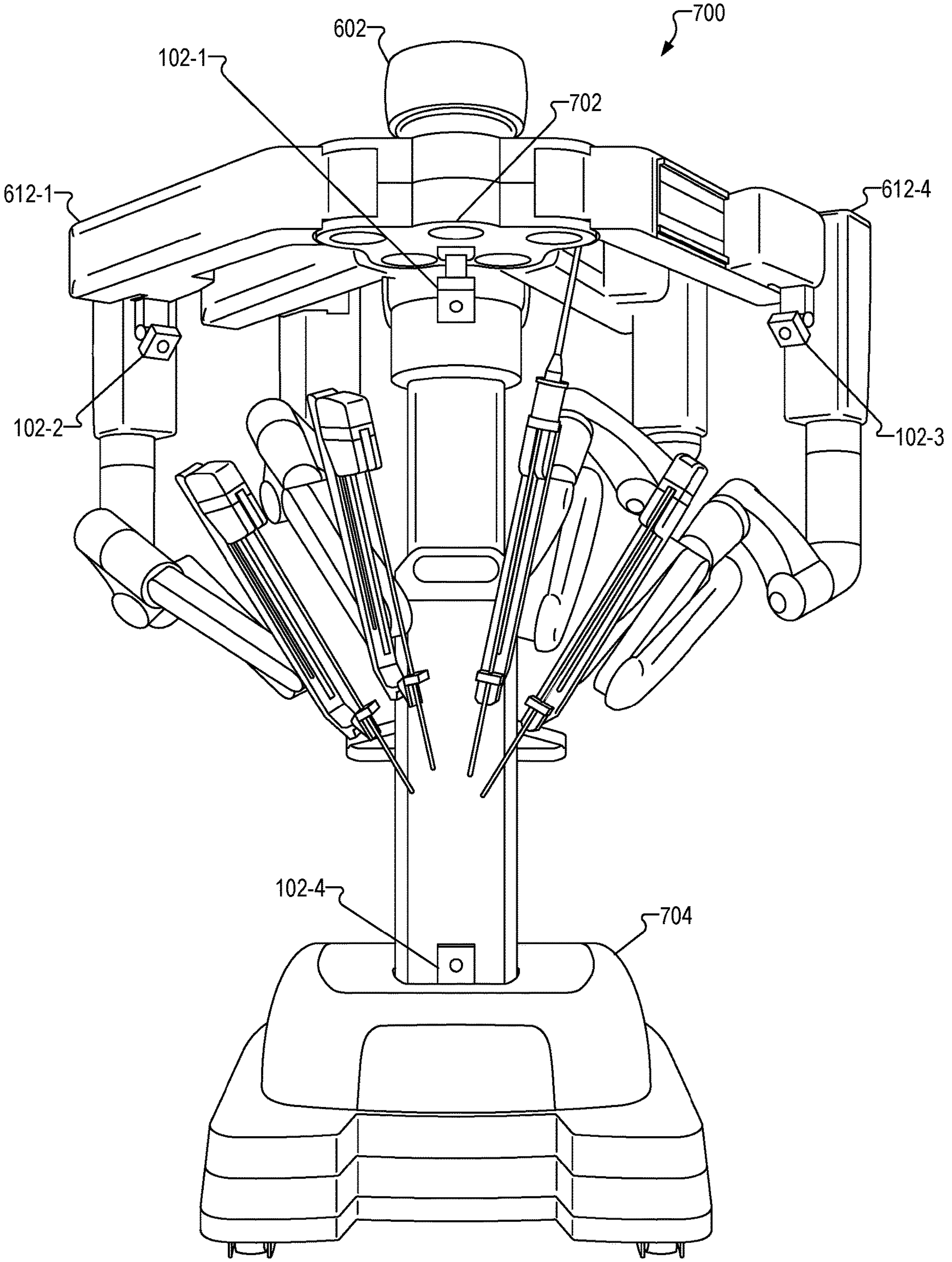
FIG. 7 depicts an illustrative configuration of imaging devices attached to a robotic surgical system according to principles described herein.

FIG. 7 depicts an illustrative configuration 700 of imaging devices 102 (imaging devices 102-1 through 102-4) attached to components of manipulating system 602. As shown, imaging device 102-1 may be attached to an orienting platform (OP) 702 of manipulating system 602, imaging device 102-2 may be attached to manipulating arm 612-1 of manipulating system 602, imaging device 102-3 may be attached to manipulating arm 612-4 of manipulating system 602, and imaging device 102-4 may be attached to a base 704 of manipulating system 602. Imaging device 120-1 attached to OP 702 may be referred to as OP imaging device, imaging device 120-2 attached to manipulating arm 612-1 may be referred to as universal setup manipulator 1 (USM1) imaging device, imaging device 120-3 attached to manipulating arm 612-4 may be referred to as universal setup manipulator 4 (USM4) imaging device, and imaging device 120-4 attached to base 704 may be referred to as BASE imaging device. In implementations in which manipulating system 602 is positioned proximate to a patient (e.g., as a patient side cart), placement of imaging devices 602 at strategic locations on manipulating system 602 provides advantageous imaging viewpoints proximate to a patient and a surgical procedure performed on the patient.

In certain implementations, components of manipulating system 602 (or other robotic systems in other examples) may have redundant degrees of freedom that allow multiple configurations of the components to arrive at the same output position of an end effector attached to the components (e.g., an instrument connected to a manipulator arm 612). Accordingly, processing system 106 may direct components of manipulating system 602 to move without affecting the position of an end effector attached to the components. This may allow for repositioning of components to be performed for activity recognition without changing the position of an end effector attached to the components.

The illustrated placements of imaging devices 102 to components of manipulating system 602 are illustrative. Additional and/or alternative placements of any suitable number of imaging devices 102 on manipulating system 602, other components of surgical system 600, and/or other components at a surgical facility may be used in other implementations. Imaging devices 102 may be attached to components of manipulating system 602, other components of surgical system 600, and/or other components at a surgical facility in any suitable way.

Figure 8:
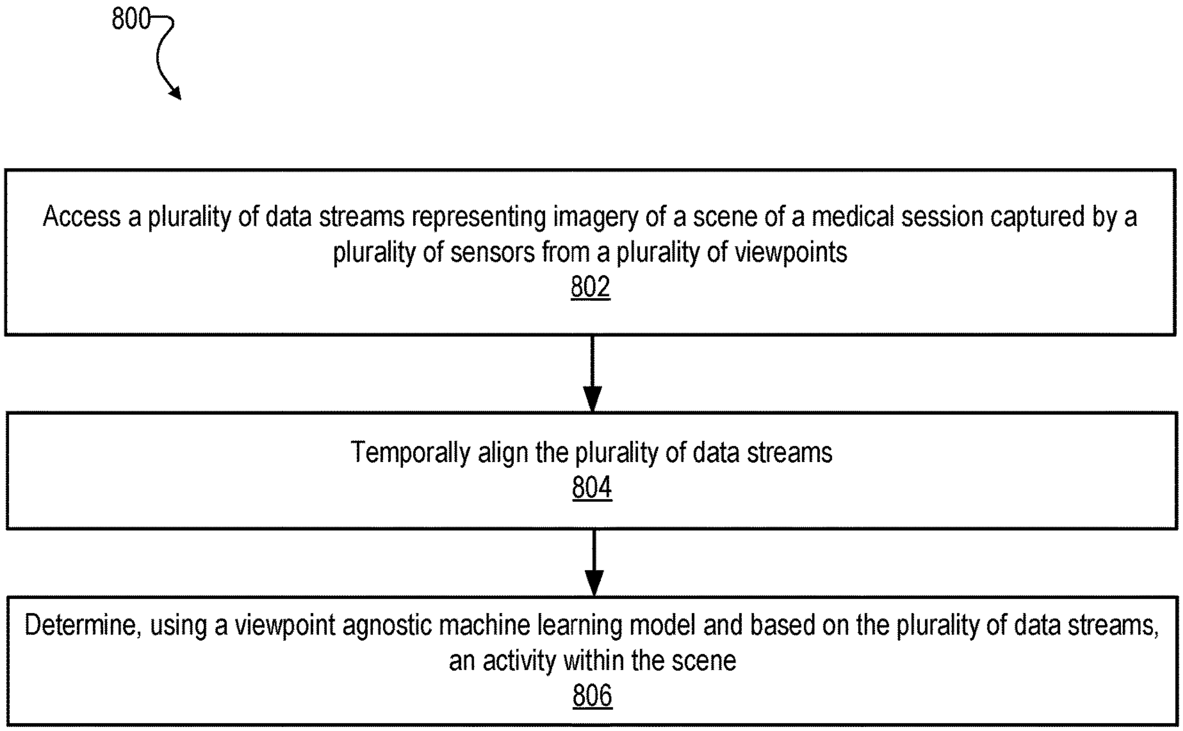
FIG. 8 depicts an illustrative method according to principles described herein.

FIG. 8 illustrates an exemplary method 800 of a multi-view medical activity recognition system. While FIG. 8 illustrates exemplary operations according to one embodiment, other embodiments may omit, add to, reorder, combine, and/or modify any of the operations shown in FIG. 8. One or more of the operations shown in in FIG. 8 may be performed by an activity recognition system such as system 100, any components included therein, and/or any implementation thereof.

In operation 802, an activity recognition system may access a plurality of data streams representing imagery of a scene of a medical session captured by a plurality of sensors from a plurality of viewpoints. Operation 802 may be performed in any of the ways described herein.

In operation 804, the activity recognition system may temporally align the plurality of data streams. Operation 804 may be performed in any of the ways described herein.

In operation 806, the activity recognition system may determine, using a viewpoint agnostic machine learning model and based on the plurality of data streams, an activity within the scene. Operation 806 may be performed in any of the ways described herein.

Multi-view medical activity recognition principles, systems, and methods described herein may be used in various applications. As an example, one or more of the activity recognition aspects described herein may be used for surgical workflow analysis in real time or retrospectively. As another example, one or more of the activity recognition aspects described herein may be used for automated transcription of a surgical session (e.g., for purposes of documentation, further planning, and/or resource allocation). As another example, one or more of the activity recognition aspects described herein may be used for automation of surgical sub-tasks. As another example, one or more of the activity recognition aspects described herein may be used for computer-assisted setup of a surgical system and/or a surgical facility (e.g., one or more operations to set up a robotic surgical system may be automated based on perception of a surgical scene and automated movement of the robotic surgical system). These examples of applications of activity recognition principles, systems, and methods described herein are illustrative. Activity recognition principles, systems, and methods described herein may be implemented for other suitable applications.

Further, while activity recognition principles, systems, and methods described herein have focused on classification of an activity of scenes captured by sensors, similar principles, systems, and methods may be applied for any suitable scene perception applications (e.g., scene segmentation, object recognition, etc.).

Additionally, while activity recognition principles, systems, and methods described herein have generally included a machine learning model, similar principles, systems, and methods may be implemented using any suitable algorithms including any artificial intelligence algorithms and/or non-machine learning algorithms.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 9:
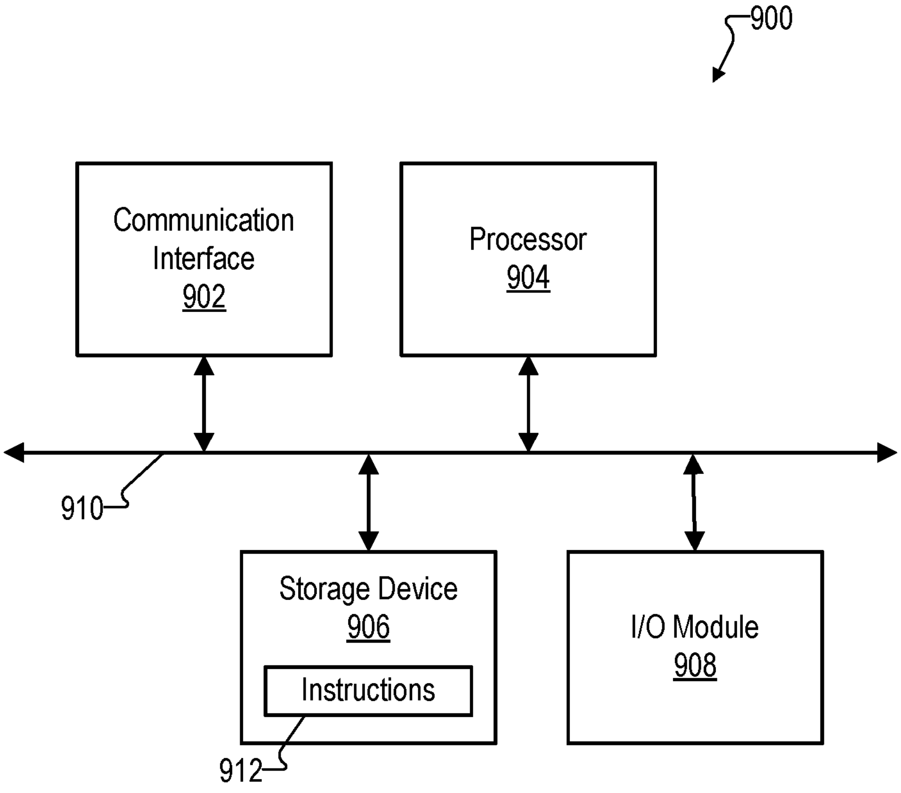
FIG. 9 depicts an illustrative computing device according to principles described herein.

FIG. 9 illustrates an exemplary computing device 900 that may be specifically configured to perform one or more of the processes described herein. Any of the systems, units, computing devices, and/or other components described herein may implement or be implemented by computing device 900.

As shown in FIG. 9, computing device 900 may include a communication interface 902, a processor 904, a storage device 906, and an input/output ("I/O") module 908 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, modules, and/or facilities described herein may be implemented by or within one or more components of computing device 900. For example, one or more applications 912 residing within storage device 906 may be configured to direct an implementation of processor 904 to perform one or more operations or functions associated with processing system 108 of system 100.

As mentioned, one or more operations described herein may be performed during a medical session, e.g., dynamically, in real time, and/or in near real time. As used herein, operations that are described as occurring "in real time" will be understood to be performed immediately and without undue delay, even if it is not possible for there to be absolutely zero delay.

Any of the systems, devices, and/or components thereof may be implemented in any suitable combination or sub-combination. For example, any of the systems, devices, and/or components thereof may be implemented as an apparatus configured to perform one or more of the operations described herein.

In the description herein, various exemplary embodiments have been described. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

a memory storing instructions; and a processor communicatively coupled to the memory and configured to execute the instructions to:

access a plurality of data streams representing imagery of a scene including a medical setting of a medical session captured by a plurality of sensors from a plurality of viewpoints, the plurality of sensors including a dynamic sensor capturing the imagery including the medical setting from a dynamic viewpoint that changes during the medical session, the plurality of data streams comprising a first data stream and a second data stream;

temporally align the plurality of data streams;

determine, based on fused data generated by a viewpoint agnostic machine learning model based on the plurality of data streams, an activity within the scene, the determining the activity within the scene comprising:

determining, based on the first data stream and the second data stream, a global classification of the activity within the scene, determining, based on the first data stream and the global classification, a first classification of the activity within the scene, determining, based on the second data stream and the global classification, a second classification of the activity within the scene, and combining the first classification, the second classification, and the global classification using a weighting determined based on the first data stream, the second data stream, and the activity within the scene; and automate, based on the determining the activity, a task associated with the medical session.

2. The system of claim 1, wherein:

the plurality of data streams comprises a first data stream and a second data stream;

the machine learning model is further configured to:

determine, based on the first data stream, a first classification of the activity within the scene, and determine, based on the second data stream, a second classification of the activity within the scene; and the generating the fused data comprises combining the first classification and the second classification using a weighting determined based on the first data stream, the second data stream, and the activity within the scene.

3. The system of claim 1, wherein the determining the global classification comprises combining, for points in time, respective temporally aligned data from the first data stream and the second data stream corresponding to the points in time using a weighting determined based on the first data stream, the second data stream, and the activity within the scene.

4. The system of claim 1, wherein the determining the global classification comprises:

extracting first features from the data of the first data stream;

extracting second features from the data of the second data stream; and combining the first features and the second features using a weighting determined based on the first data stream, the second data stream, and the activity within the scene.

5. The system of claim 1, wherein the determining the activity within the scene is performed during the activity within the scene.

6. The system of claim 1, wherein the plurality of data streams further comprises a data stream representing data captured by a non-imaging sensor.

7. The system of claim 1, wherein the viewpoint agnostic model is agnostic to a number of the plurality of sensors.

8. The system of claim 1, wherein the viewpoint agnostic model is agnostic to positions of the plurality of sensors.

9. A method comprising:

accessing, by a processor, a plurality of data streams representing imagery of a scene including a medical setting of a medical session captured by a plurality of sensors from a plurality of viewpoints, the plurality of sensors including a dynamic sensor capturing the imagery including the medical setting from a dynamic viewpoint that changes during the medical session, the plurality of data streams comprising a first data stream and a second data stream;

temporally aligning, by the processor, the plurality of data streams;

determining, by the processor, based on fused data generated by a viewpoint agnostic machine learning model based on the plurality of data streams, an activity within the scene, the determining the activity within the scene comprising:

determining, based on the first data stream and the second data stream, a global classification of the activity within the scene, determining, based on the first data stream and the global classification, a first classification of the activity within the scene, determining, based on the second data stream and the global classification, a second classification of the activity within the scene, and combining the first classification, the second classification, and the global classification using a weighting determined based on the first data stream, the second data stream, and the activity within the scene; and automating, based on the determining the activity, a task associated with the medical session.

10. The method of claim 9, wherein:

the plurality of data streams comprises a first data stream and a second data stream;

the machine learning model is further configured to:

determine, based on the first data stream, a first classification of the activity within the scene, and determine, based on the second data stream, a second classification of the activity within the scene; and the generating the fused data comprises combining the first classification and the second classification using a weighting determined based on the first data stream, the second data stream, and the activity within the scene.

11. The method of claim 9, wherein the determining the global classification comprises combining, for points in time, respective temporally aligned data from the first data stream and the second data stream corresponding to the points in time using a weighting determined based on the first data stream, the second data stream, and the activity within the scene.

12. The method of claim 9, wherein the determining the global classification comprises:

extracting first features from the data of the first data stream;

extracting second features from the data of the second data stream; and combining the first features and the second features using a weighting determined based on the first data stream, the second data stream, and the activity within the scene.

13. The method of claim 9, wherein the determining the activity within the scene is performed during the activity within the scene.

14. The method of claim 9, wherein the plurality of data streams further comprises a data stream representing data captured by a non-imaging sensor.

15. A non-transitory computer-readable medium storing instructions executable by a processor to:

access a plurality of data streams representing imagery of a scene including a medical setting of a medical session captured by a plurality of sensors from a plurality of viewpoints, the plurality of sensors including a dynamic sensor capturing the imagery including the medical setting from a dynamic viewpoint that changes during the medical session, the plurality of data streams comprising a first data stream and a second data stream;

temporally align the plurality of data streams;

determine, based on fused data generated by a viewpoint agnostic machine learning model based on the plurality of data streams, an activity within the scene, the determining the activity within the scene comprising:

determining, based on the first data stream and the second data stream, a global classification of the activity within the scene, determining, based on the first data stream and the global classification, a first classification of the activity within the scene, determining, based on the second data stream and the global classification, a second classification of the activity within the scene, and combining the first classification, the second classification, and the global classification using a weighting determined based on the first data stream, the second data stream, and the activity within the scene; and automating, based on the determining the activity, a task associated with the medical session.

* * * * *